May 3, 1927. 1,626,787
E. H. CORLETT
METHOD AND APPARATUS FOR EFFECTING OPTICAL PROJECTIONS
Filed April 17, 1920 3 Sheets-Sheet 1
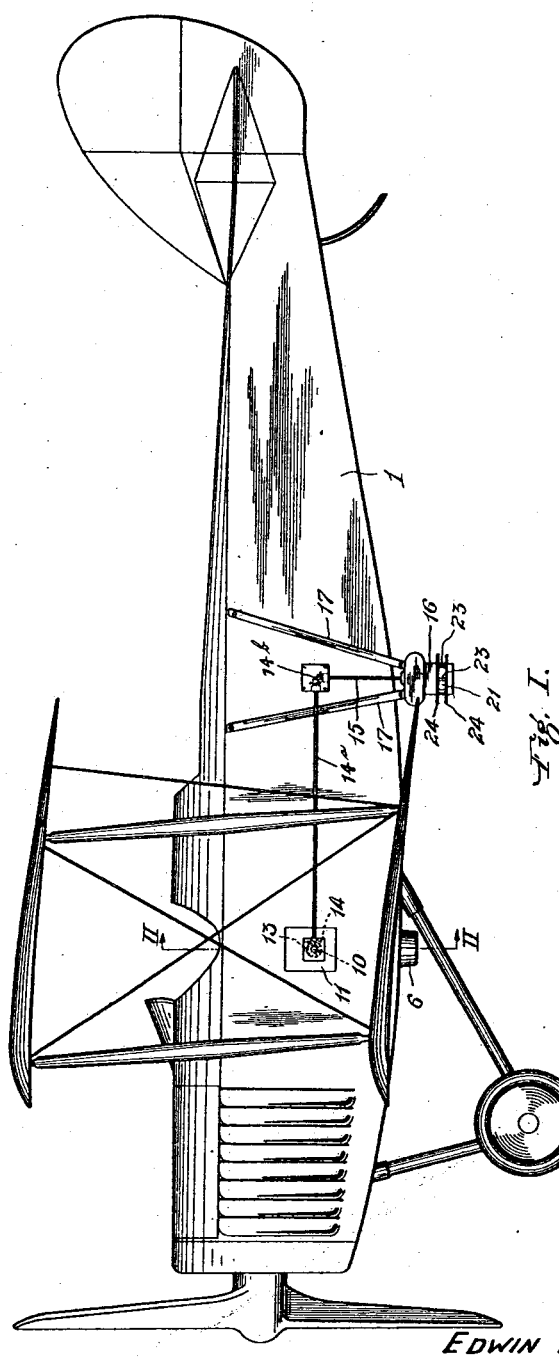
Inventor:
EDWIN H. CORLETT
by his atty.

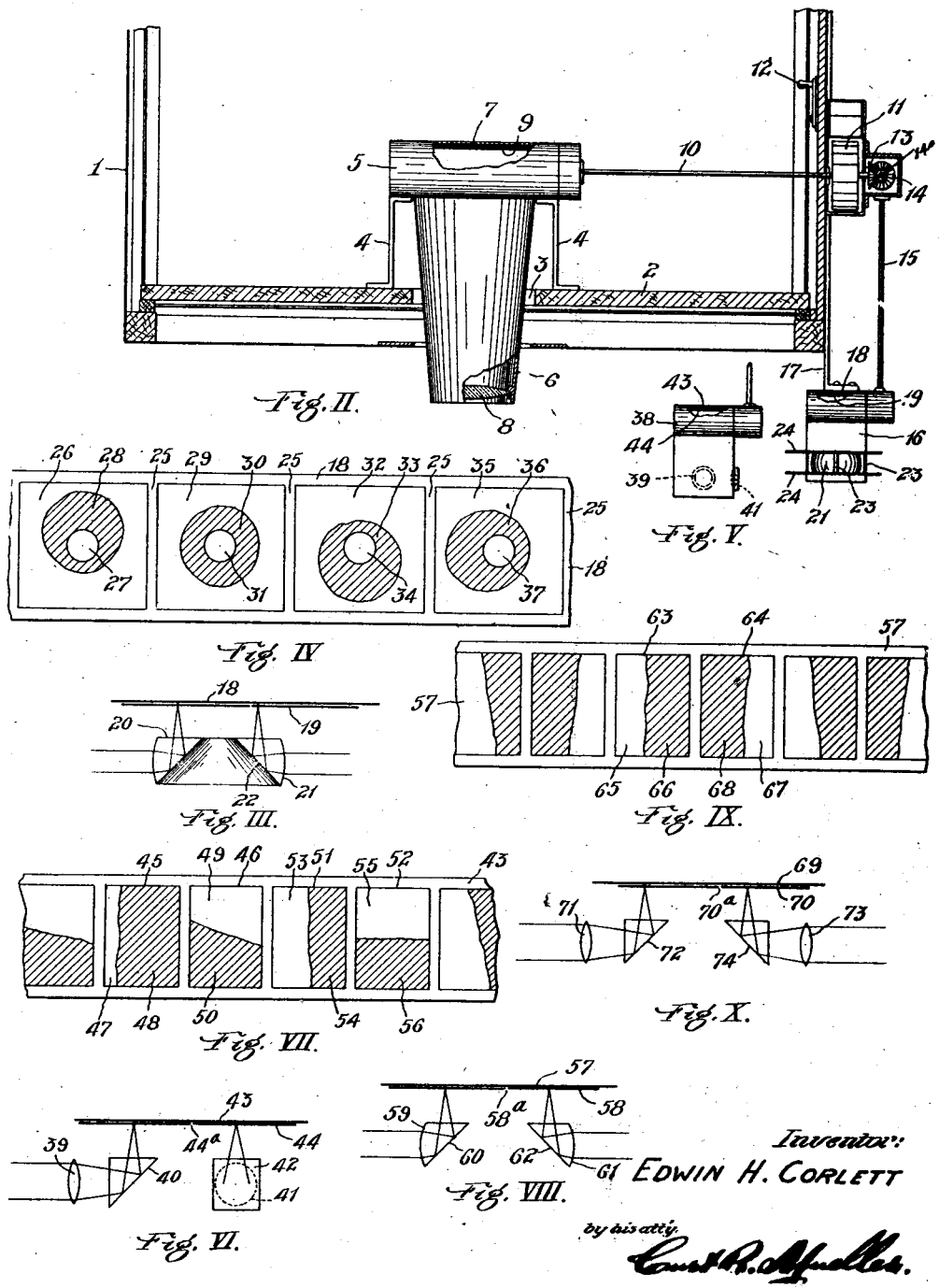

May 3, 1927. 1,626,787
E. H. CORLETT
METHOD AND APPARATUS FOR EFFECTING OPTICAL PROJECTIONS
Filed April 17, 1920 3 Sheets-Sheet 3
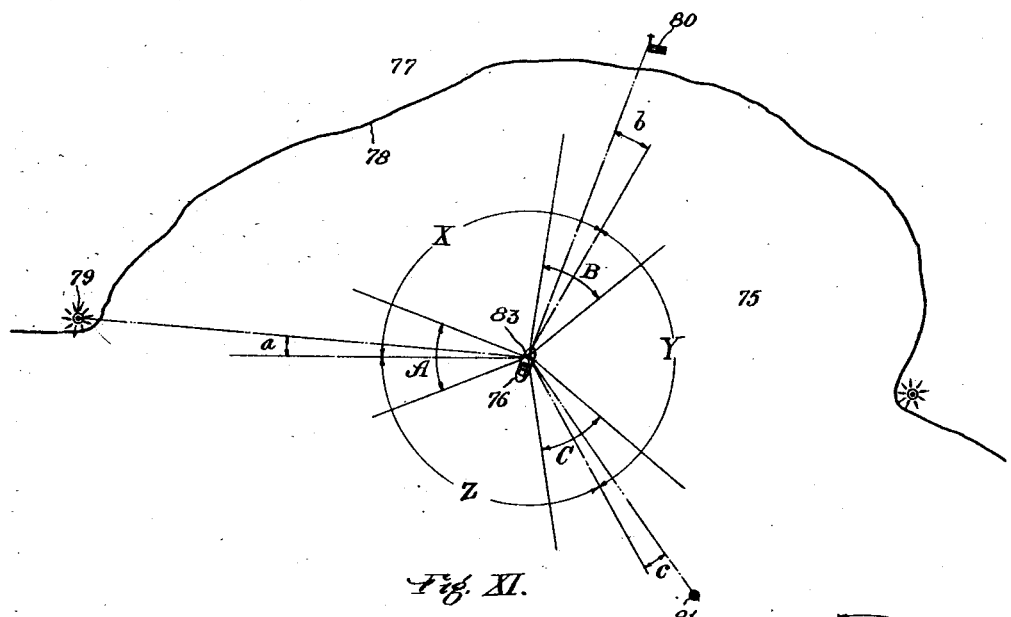
Fig. XI.
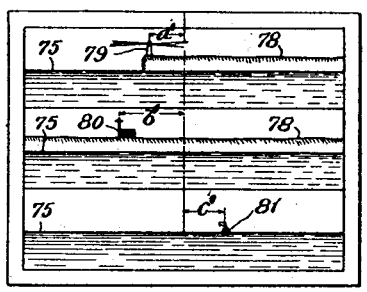
Fig. XV.
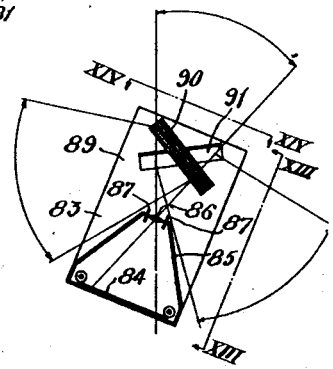
Fig. XII.
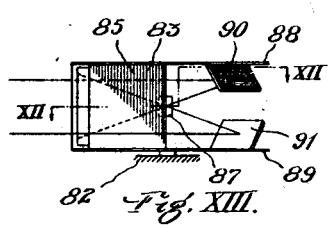
Fig. XIII.
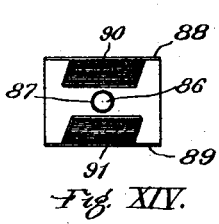
Fig. XIV.
Inventor:
EDWIN H. CORLETT
by his atty.

Patented May 3, 1927.

1,626,787

UNITED STATES PATENT OFFICE.

EDWIN H. CORLETT, OF EAST CLEVELAND, OHIO.

METHOD AND APPARATUS FOR EFFECTING OPTICAL PROJECTIONS.

Application filed April 17, 1920. Serial No. 374,539.

My invention pertains broadly to a co-ordinated association of method and apparatus for effecting optical projections with a carrier which is subject to tilting movement. More particularly the invention relates to the method of and to an appliance for registering and tabulating in synoptical array the tilts of the body which is either periodically or continually subject to movement relative to a given plane. Whether the object, whose deviation from a certain plane it is desired to record, is supported by land or water or air, or how the registrations of the instrument are portrayed, manifestly, is of no consequence to the foregoing denomination of my invention.

The experience which I acquired in aero photography, taught me the deficiencies in the practise of this modern art and the imperfections in the results obtained. Accordingly, while I fully appreciate the extensive and differing industrial uses which may come to be made of my invention, I have naturally chosen to exemplify in the drawings of this application how it enables an aero photograph to be accurately considered, by means of an apparatus which might be called a photo-sextant or photo-clinometer because it will make a photograph of one or more points or line on the horizon or the whole horizon upon a sensitized area or surface the plane of which bears a known relation to its support or to the aircraft by which it is carried, and the tilt of which it is desired to know and to record.

It is known that the commercial value of aerial photography promises to be great, owing to the uses for topographical maps so to be made. Serial pictures obtained by aerial photography of the terrain have never been accurate because of perspective in the picture, and it has been impossible perfectly to correct owing to ignorance of the amount and direction of imperfection. The aero-camera, of the automatic type, is mounted on shock absorbers, and so lined up as to be, excepting for angular deviation due to shock, in such a position that the sensitized surface is parallel to the horizon when the aeroplane is flying at any predetermined speed with respect to the air. Therefore, pictures so taken should show no perspective where the terrain is generally level. However, it is impossible, due to air currents and to the human element in control of the aeroplane, to expect the aeroplane constantly to fly parallel to the horizon. It tips along its line of flight or tilts at right angles thereto, or does both, in any of several directions. This results in a perspective element in the picture taken, unknown in amount and direction, unless direction and angle of inclination are known, or unless the true location of several points on the ground are known. With the latter alternative we are not here concerned. I will briefly explain five proposals which have been made to solve this problem, specifying first the three which have been tried and why none has been nor can be successful.

1. A camera suspended so as to allow it universal motion as a damped pendulum, intending thereby to have it always assume a vertical position, but when the aircraft suddenly changed its direction with respect to the earth or its speed, the axis of the camera as a pendulum was temporarily thrown out of vertical position due to its inertia with respect to the aircraft. Needless to say, air currents are constantly changing the rate of flight of the aeroplane with respect to the earth, the change ranging from that so small as to escape notice to that so large as to produce apparent backward motion of the aeroplane, or to produce an increase of velocity equal to the velocity of the fastest wind encountered. Obviously the pendulum will not do. A variation consisted in swinging glass pendula within the camera, so as to register on the film or plate the direction and amount of tilt. Any modification of the pendulum principle will solve the difficulty only when rate and direction of flight with respect to the earth remain constant.

2. Human control of the aircraft so that an exposure may be made at the instant the camera is level as determined by a level tube, but this was only a modification of the pendulum idea being subject to the same objection, namely, the inertia in this case of the fluid. A level has been used in training aeroplanes to enable the pilot to know when he was making a correct bank, or turn.

3. The attempt has been made to stabilize the aerocamera in a universal mounting by means of the gyrostat and also by means of the gyroscope. In the case of the gyrostat, a turning couple applied in any plane perpendicular to the (presumably) horizontal rotor produces proportionate inclination according to amount and time applied. To limit the inclination to a negligible quantity requires a machine with a rather heavy rotor traveling at very high speed. In the case of the gyroscope, a sensible deviation is required before the precessing action of the swinging rotor is brought into play. The gyrostat and gyroscope are both open to the objection, in addition to the ones enumerated, of maintaining position with respect to space and not with respect to the earth, excepting in so far as a line through the apparatus maintains itself parallel to the axis of the earth. However, a line at 90° to the earth's axis turns through 15° per hour in an east and west direction. The following schemes have, so far as I am aware, merely been proposed.

4. Photographing the sun with respect to the meridian and the needle of a compass at the time each picture is taken thereby furnishing a point of reference fixed for all intents and purposes. Theoretically, this would give perfect control, both of meridian and of inclination, as the position of the sun at any instant on any day is known. This cannot be relied upon because of the inaccuracy of the compass. However, much subsequent calculation would be required, even if the compass could be depended upon.

5. It has also been proposed to use the gyroscope or the gyrostat to furnish a fixed point for a camera, rigidly mounted, to register on the film. Such scheme would be the maintaining of an artificial reference plane by photographing some point of a gyroscope. This is in turn only a modification of the gyroscope method previously explained, and is subject to the same objection.

6. It has been suggested that cameras be mounted on the earth at known positions so as to command a view at all times of the aeroplane; and that auxiliary cameras be mounted on the aeroplane in positions bearing a known relation to that of the aerocamera and commanding respectively each of the cameras mounted on the ground; and that views be taken simultaneously with each. Theoretically, this would give perfect control, not only of inclination, but also of location and orientation. The complication, as well as the difficulty of securing even approximately perfect synchronism, of mechanism, obviously preclude this method for some little time.

7. It is possible to make all corrections necessary by a reducing camera if the locations of any four identifiable points on the photograph can be provided by survey. The conditions for this require that the four control points be on approximately the same level plane and that the figure be at least one quarter, by linear dimensions, of the area it is intended to correct, (one sixteenth the area). This is expensive and troublesome, and in wilderness country, practically impossible of attainment.

It may not be amiss to distinguish certain well known instruments, to indicate their impertinency to my invention. A stereoscope records simultaneously and from two different points the angle of parallax of any point with respect to the two known points. The duplex result is not necessarily simultaneously obtained though it has been. A photo theodolite takes two photographs successively at an angle. A sextant brings two objects into coincidence, whereby the angle in either a vertical or horizontal plane may be measured. A clinometer reads the angle of incidence of objects with the horizon and registers to the eye inclination or angular deviation.

It is to be understood that the support or vehicle which carries my apparatus is not to be construed as restrictive of the many fields in which my invention may evidently be feasibly and usefully applied.

One scheme of my invention is the coincident recordation of two results, one of which by itself must inevitably be indefinite or at least not precise, by establishing the relation of such result to the other result which can be and is based on known factors. Comprehended by the preceding is the idea of a serial recordation, photographically in this instance, of the position of an aircraft with reference to the plane of the horizon. Specifically, aerial photographs are not reliably true images because tilts of the aircraft tilt the plane of the film or plate at angles to the plane of the terrain and result in distortions. Instead of trying to hold the sensitized surface horizontal either by manual control or automatically by gravitational action, I have discovered means for certainly and accurately ascertaining at what angle the picture was taken. With that knowledge it is a simple matter to correct, because from knowledge of an angle follows the knowledge that the picture has elements of perspective and also their amount. Then correction by elimination of perspective leaves merely the calculation of scale so that the composite picture or map may be brought to a uniform scale. Theoretically, the only thing to which an aircraft may tie, excepting artificially established points, is the horizon. This is the key to my exemplifying solution. An angle observing camera is carried along with an aerial camera and arranged to be operated substantially simultaneously therewith. I propose to obtain at the instant of exposure of the main view camera, photographs of part or all of the visible horizon by means of a camera whose sensitized film surface is in a position which bears a known relation to that of the main camera. Obviously, sections of the horizon with or without outstanding objects to view are equivalent to targets. From this visible horizon, the true horizon can be determined with sufficient accuracy to register inclination of the terrain sighted camera at the instant of its exposure. While the accuracy is probably not sufficient to permit this method to be used in obtaining controls, it will certainly be accurate enough to reduce the error within any one picture, due to inclination of the camera, to a negligible amount. The two photographs or other and possibly dissimilar records which were made at the same time and which are to be compared, may be identified by simply comparing the two exposures which have the same place in the series and which must have been made at approximately the same time. The misplacement of the image on the photographical record from the center of the horizon which is a known point at the moment of recordation, reveals the inclination or angle of deviation of the aircraft from its horizontal position. The knowledge of the direction of tilt in consequence of which the misplacement occurred may be had, because the established relation, for simplicity preferably a parallel relation, between the planes of the two photographically sensitized surfaces was known in the beginning. The result is independent of human control and hence obviates the need of reckoning with the human error or personal equation of fault. The record is reliable because it is absolute in so far as the visible horizon varies by a negligible amount from the true horizon.

Adverting to the drawings:

Figure I is a side elevation of an aeroplane equipped with an apparatus for effecting optical projections embodying my invention.

Figure II is an enlarged fragmentary cross section taken through the cock pit along line II—II of Figure I and showing the mounting of the aerocamera together with its connection with my apparatus for effecting optical projections.

Figure III is an enlarged diagrammatic view of my preferred form of objective and showing its relation to a film and to a focal plane shutter.

Figure IV is an enlarged plan view of a piece of film showing a series of successive exposures through the objective illustrated in Fig. III.

Figure V is an elevation of one part of my apparatus as shown in Figure II with a modified form of objective.

Figure VI is an enlarged diagrammatic view of the objective employed in Figure V including twin lenses and twin reflectors set at an angle of 90° with reference to each other.

Figure VII is an enlarged plan view of the piece of film showing a series of twin exposures made through the duplex objective shown in Figure VI.

Figure VIII is a similarly enlarged diagrammatic view corresponding to Figure VI and illustrating a modification consisting of combined twin lenses and reflectors of a twin objective.

Figure IX is an enlarged plan view of a piece of film, showing a series of twin exposures made through either the objectives shown in Figure VIII or the objectives shown in Figure X.

Figure X is another diagrammatic view of a twin objective including twin lenses and reflectors opposed to each other.

Figure XI is a plan view of a harbor, a ship and a plurality of locating points and also showing the angle of view of a plurality of objectives, together with certain angular measurements.

Figure XII is a plan section of a camera embodying certain modified principles of my invention.

Figure XIII is a side elevation of the camera viewed on line XIII—XIII of Figure XII.

Figure XIV is an end view of the camera looking into the front thereof or on line XIV—XIV of Figure XII.

Figure XV is an enlarged plan view of a picture taken by the camera when mounted on the ship shown in Figure XI, so as to include in three distinct images three of the locating points shown in Figure XI.

An aeroplane which I have selected as an exemplifying carrier or unstable support for my instrument includes a body 1 having its cock pit or fuselage provided with a floor 2, having an opening 3. Mounted adjacent to the opening 3 are a pair of supports 4 adapted to sustain an aerocamera 5 from which what may be termed a rigid bellows 6 extends downwardly through the opening 3. The aerocamera at present used includes a moving picture film, having sensitized areas 7 intermittently fed at predetermined regular intervals of time to the recording plane behind an objective 8 and also behind an interposed focal plane shutter 9 as appears in Figure II.

The recording plane of the film area 7 is preferably parallel to the horizontal position of the aeroplane. The frequency of exposure is such as to provide a slight overlap in the images obtained. It is common practice to have the film feed and shutter action automatically co-ordinated and inasmuch as nothing is claimed for such mechanism of itself it need not be shown in detail, but is to be considered as operated by a flexible shaft 10 connected with a wind motor 11, commonly mounted at the side of the fuselage or body 1. A lever 12 enables a damper control of the motor 11 and thereby the frequency with which pictures are taken in the camera 5. All of the parts thus far described are old knowledge to the art.

My angle observing instrument, according to the exemplification of Figures I and II, is another camera automatically operated and coordinated in action with that of the aerocamera 5. The co-ordination should be such that the two cameras will make exposures simultaneously or at substantially the same time, say, during the period of time required to expose the main terrain picture. I accomplish this by providing the outer extremity of the wind motor shaft with a bevel pinion 13, which meshes with a bevel pinion 14 on a shaft 14^A, the other end of which has a miter gear connection at 14^b, with a vertical shaft 15 adapted to operate the mechanism of a second aerocamera 16 in the same manner as that just described in connection with the camera 5. This camera 16 is supported at the side of the aeroplane body by brackets 17, and preferably in such a position that its film 18, relatively smaller solely for purposes of economy, and focal plane shutter 19 are substantially parallel with the film 7 and shutter 9. The aperture in the shutter 19 is clearly shown in Figure III and requires no reference numeral.

My preferred form of objective consists of an annular construction 20 provided with an exterior annular lens surface 21 and an interior annular reflecting surface 22, which is in fact a truncated conical surface. The axes of the objectives 8 and 20 are as nearly as possible parallel. The purpose of the objective 20 is to project a complete horizon image including a land and a sky portion. As appears in Figure II, I prefer to mount upon four supports 23 a pair of annular shields 24 purposed to prescribe the angle of view. The four supports 23 being so small and so close to the lens will cause a negligible halation.

It is to be observed that the objective shown in Figure III comprises a combination of two generated surfaces adapted to transmit light rays one to the other so that said rays at some stage of their projection lie in a conical surface. The combination of generated surfaces also changes the direction of light rays, both by refraction and reflection. Moreover, one of said surfaces is generated about a line forming an angle with the normal to such surfaces at the common point of intersection of said line and normal with said surface. The objective is composed of a plurality of optical units defined by surfaces adapted to transform planes of light into both converging and diverging rays lying in a conical surface. The lens surface 21 does not have to be a corrected lens, because no correction for either color or spherical aberration is needed.

Directing attention to Figure IV it will be seen that the film 18 shows a series of four exposures separated by blank strips 25. Each exposure will be seen to reveal an approximately round land image. Each land image encloses a round blank film portion corresponding to that portion of the terrain which was under the camera, and therefore outside of its field of view. Such blank film circle constantly remains fixed relative to the limits of the area of its particular exposure. It is preferably always at the middle of the exposed area of the film. Each round land image is surrounded by an adjoining sky image, evenly if the aeroplane was flying horizontally at the moment the picture was taken, but unevenly if the aeroplane either dipped or tilted. This furnishes the clue to my solution, enabling the tilt of the aeroplane to be determined according to the displacement of the land image relative either to the blank circle or relative to the limits of the particular sensitized area on which it appears. That part of an aeroplane which depresses during flight or becomes tilted downwardly determines the direction in a particular picture to which the center of the circular land image will be shifted. Specifically, the left one of the four pictures shown in Figure IV includes a sky image 26, a central blank circle 27, and a round land image 28 eccentrically disposed with reference to the circle 27 in a direction toward the top of the sheet. This indicates that the part of the plane nearest the side on which the major portion of the land image appears must have dipped downwardly at the moment the picture was taken, so as to bring a larger parcel of land into the field of view. The next picture to the right, including sky image 29, land image 30, and blank circle 31, indicates that the aeroplane was flying substantially level when it was taken and that the picture simultaneously taken in the aerocamera 5 will be free from any element of perspective. The third picture to the right, including sky image 32, land image 33, and blank circle 34, indicates that the plane tilted in the opposite direction when it was taken than it had tilted when the picture furthest to the left was taken. The picture at the right and including the sky image 35, land image 36 and central blank circle 37, indicates that the aeroplane, at the moment of exposure, underwent a compound tilt, let us say, both downwardly in a forward direction and with its right wing depressed. As will now be understood, my angle measuring instrument or auxiliary camera comprises a sensitized area, a lens and a reflector so disposed as to produce a horizon image on said area of which the dividing line between land and sky shifts according to the tilt of the aeroplane at the moment of exposure of said area. However, the dividing line shifts in just the opposite manner from which a level bubble would shift. In other words, an image is produced, one point of which is fixed relative to a point on the exposed film, while another point of which is displaced relative to the point on said film according to the tilt of the aeroplane or of the camera, whereby the position of either at the time of exposure may be inferred according to the angular displacement of the line where the land and sky images join. Also, the relative sizes of the land portion of the image and of the sky portion of the image vary according to the deviation from horizontal of the instrument which records such images.

The basic idea of this is the determination of the position of a given plane with respect to any system of co-ordinates on another plane by observations of this co-ordinated plane through a device whose position with respect to the first plane is known. The lateral targets which may or may not be determinants of an horizon line constitute objects to be simultaneously photographed from the aircraft at any given moment and in that manner the equivalent of a photographic resection is made for a new and useful purpose.

It is to be remembered that it is not essential, merely preferable, that the films 7 and 18 be parallel. They must, however, be in known relation to each other, to be exact, the angular relation, if any, between the film 7 and the film 18 must be known so that after areas of each have been exposed simultaneously or substantially so, proper correction may be made for any perspective in the aerial photograph taken by camera 5. Thus, all of the pictures taken by the camera 5 may be brought to a uniform scale or all parts of the image on any one picture made uniform.

The modification illustrated in Figures V and VI consists in the substitution of twin objectives for the annular objective. In this instance an auxiliary camera 38 is provided with right angularly disposed objectives. One such objective includes a lens 39 and a reflecting surface 40 spaced relatively thereto and disposed in an oblique position as appears in Figure VI. The other of the twin objectives includes a lens 41 and a reflecting surface 42, likewise spaced from and in an oblique position. It will be perceived that each objective will project a part of the horizon as an image upon adjacent portions of a sensitized area of a film 43, and that such double projection is subject to the control of a focal plane shutter 44. While these two exposures are not made simultaneously, owing to the disclosure of a single shutter aperture 44ª, the pictures will be taken nearly enough at the same time for all practical purposes, and of course, the shutter 44 could be provided with two apertures enabling both pictures to be taken at the same instant. While such twin objectives are perhaps somewhat more economical of manufacture, they require more precision in mounting and are more apt to become disordered with respect to each other. Inasmuch as the objectives are sighted at an angle of 90° with regard to each other, one will best record the lateral tilts of the aeroplane, whereas the other will best record the fore and aft dipping movement. In fact, one of the twin objectives could furnish adequate information since the tipping about one horizontal axis would shift the horizon line across the film whereas tipping about the other horizontal axis would alter the angular position of the horizon line with reference to the borders of the film. A scrutiny of Figure VII discloses a strip of the film 43 upon which twin images appear. One pair of nearly simultaneously exposed areas 45 and 46 are shown to the left. The area 45 includes a sky portion 47 and a land portion 48, mainly disposed on opposite sides of the longitudinal middle of the film respectively, whereas the other area 46 has an image, consisting of a sky portion 49 and a land portion 50, having a common bordering edge which extends across the film 43. The same principle applies, and in this instance explains that there was very little tilt at the moment of exposure but considerable dip. In other words, the area 46 is about equally divided by the land and sky portions of the image, whereas the land portion 48 of the image on the area 45 greatly exceeds the sky portion 47. Another twin exposure on this film was made on two areas 51 and 52 and from the evidence furnished by the nearly equal division of the sky portion 53 and land portion 54 of the one image and similarly the nearly equal division of the sky portion 55 and the land portion 56 on the other image, it is to be properly concluded that the aeroplane was flying nearly level at the moment these twin images were recorded.

The modification shown in Figure VIII proposes to expose a film 57 by means of a shutter 58, having an aperture 58ª by means of twin objectives arranged along the same line, so as to record partial horizon images including objects 180° apart. One objective includes a lens 59 and a combined reflector 60. The other objective includes a lens 61 and combined with it a reflector 62. This modification is the equivalent of using merely diametrically opposed sections of the annular objective shown in Figure III. The piece of film 57, illustrated in Figure IX, includes a pair of twin areas 63 and 64. The former includes a sky portion 65 and a land portion 66, and the latter includes a sky portion 67 and a land portion 68. In this case, each of the twin images includes a dividing line between its sky and land image running crosswise of the film, because both objectives were directed along the same line, but as, the land image on one of the twin film areas increases, the land image on the other film area would correspondingly decrease in due proportion. Figure X discloses a modification differing in structural arrangement from but identical in result, as the modification just previously described. The exposure of a film 69 is subject to the action of a shutter 70, having an aperture 70ª through which twin images are to be projected in very close succession, one through a lens 71 and reflector 72 in spaced relation, and the other through a lens 73 and a reflector 74, likewise in spaced relation. It will doubtless be obvious that the objectives shown in Figures VIII and X will be less satisfactory than the twin objectives shown in Figure VI, or than the preferred objective shown in Figure III, because the first mentioned arrangements, if it is assumed that their opposed objectives have forward and rearward fields of view, will be less sensitive to lateral tilts.

It is to be noticed that in all the forms of objectives thus far described, I interpose a reflecting surface between a lens and a sensitized area, and that I furthermore provide an obliquely disposed reflecting surface, or more particularly a reflecting surface oblique to a plane bounding an angle of view.

The drawings on sheet number three pertain to a different use of my invention and also show the employment of a different objective. This modification comprises a multiple view camera with a single lens for making harbor surveys. Directing attention to Figure XI, which is a plan view of a harbor with water 75, a ship 76, thereon, land 77, including an eminence 78 along the shore of the harbor, a light-house 79, a church 80 and a buoy 81. Mounted upon a suitable support 82, carried by the ship is a camera 83, containing a film 84, a bellows 85, which of course may be either rigid or collapsible. but supports a lens 86 in a tube 87 intended to shade the lens. Carried on opposite sides of the camera and projecting forwardly ahead of the lens are a pair of supports 88 and 89 for holding in place a pair of reflectors 90 and 91. These reflectors may be mirrors and are so mounted above and below the lens 86 and a predetermined distance ahead of it as not to prevent projection of an image directly to the lens, as clearly appears in Figures XIII and XIV. The reflectors 90 and 91 are moreover disposed obliquely to the focal plane and at equal though reversed angles with reference thereto. The arrangement is preferably such that the axes of the three images are 120° apart and such three equal angles X, Y and Z appear measured in Figure X. The effective angles of view A and C of the two reflectors 90 and 91 are such as to include the light house 79 and the buoy 81, whereas the church 80 is included in the direct angle of view of the lens 86. Those portions of the three angles of view A, B and C, which are defined by the three axes and the direct lines between the camera and the light house. church and buoy, I have also shown measured in Figure XI and denominated $a$, $b$, and $c$, respectively. The distances $a'$, $b'$ and $c'$ are the image distances of the points 79, 80 and 81 from the axes of A, B and C respectively.

The triple picture shown on the sensitized area 84 of Figure XV shows in each case the water 75, the land eminence 78 and either the light house 79, church 80, or buoy 81. The light house and buoy appear to the left and right of the picture which is the reverse of their locations with respect to the axes of the fields of view A and C, because they are reflected images. On the other hand, the church 80 appears to the left of the axes of the field of view B in Figure XI and is similarly to the left in Figure XV, because the projection of the church image was directly through the lens.

The camera 83 is simply a modification of the one previously discussed, in that two reflectors 90 and 91 are mounted so as to produce images to each side of a central image. the axes of the three images being presumably and preferably at 120° to each other. In some case if a wider angle lens is had reflectors may be removed far enough from the camera as to enable them to shoot over and under the camera, respectively.

The locations of the light house 79, church steeple 80 and the buoy 81 are known, and platted. At any position of the ship a sounding or other observation is made. and photographs taken, in this case, the direct view to the lens 86 includes the steeple, whereas the light house and the buoy are taken by reflection and hence appear with left to right reversed on the photograph.

Angles X, Y and Z are preferably the same.

The tangent of angle $a$ substantially equals $a'$ divided by the focal length of the lens used. The tangent of angle $b$ substantially equals $b'$ divided by the focal length of the lens used. The tangent of angle $c$ substantially equals $c'$ divided by the focal length of the lens used. With angles $a$, $b$ and $c$, and X, Y and Z, all known, and the positions of the three points used being known, the point where the sounding is made is located definitely.

Therefore, the method consists merely in the ship taking its sounding measurement and making a single exposure for each observation. The only methods now in use call for triangulation from a shore base line by two transits simultaneously, or the ranging in of the ship along a certain known line, and the intersection of that line by the line from the ship to a transit placed in a known relation to the range line. The economy in time and money of the first, or photographic method, over the second, or survey, method, is so obvious as to need no elaboration or explanation. The same camera, provided with a tripod and a sensitive spirit level would register the location, both horizontal and vertical, of a point on land, with respect to three known points.

The use of a horizon image as obtained by the disclosed means hinges upon the fact that tilt in any direction of the angle registering camera is registered by the displacement, either in direction or angularly, or both, of the image of the horizon on the sensitized area and therefore the shifts in any direction of a bordering and usually sinuous line of demarcation between the land and sky images. The amount and direction of such displacement is necessarily a function of the angle of tilt combined with the direction of tilt, and is therefore ascertainable mathematically or by experiment. Knowing the amount and direction of tilt, correction of the main photograph is a matter of detail involving any one of several known methods, all of which essentially consist in rephotographing the main photograph from a point which lies in a plane comprising the axis of the lens when the photograph was taken and the vertical line through the camera, and which is on the opposite side of the said axis from the said line, by an amount which is a function of the correction and scale desired and the focal length of the correcting lens.

Thus a negative free from elements of horizontal perspective may be obtained either by projecting the distorted image of the original negative to a sensitized surface held at the proper angle for correction or by rephotographing a print of the original negative held at an angle to the plane of the correcting negative. A joint application with Max W. Garnett, discloses such reversed alternative means for eliminating elements of perspective with the aid of an easel universally movable about a fixed point, together with a four point control figure, was filed May 14, 1920, Serial No. 381,402.

The scheme of my invention may be said to depend upon the use of any optical apparatus including either lenses or reflectors or both, together with or without photographic apparatus, which will record for measurement a plurality of either points, lines or areas partially or wholly outside of some other point, line or area the location of which with respect to the previously considered known point, line or area it is desired to ascertain.

I wish it to be understood that the basic idea of this patent application is the determination of the position of an inanimate observer (here the aero camera) with respect to the object observed by means of the observation or recordation or both, of images of points which may be of known location, or the location of which may be established casually in the operations involved in determining that of the so-called inanimate observer.

First I shall discuss the matter of simultaneous observation or recordation. Assume that the aerocamera takes, during any short space of time, a photograph of terrain. Now, in this patent application I have called for simultaneity in the operation of the main aerocamera and the optical instrument or auxiliary camera as the qualifying element, but as a matter of fact it is not necessary to have them operated quite simultaneously. The idea is the observation and possible recordation of the spatial position of the camera during its time of exposure (which, so far as we are concerned, may be regarded as instantaneous). Now, if for a short period before and a short period after, a series of observations were made, each spaced from its neighbor by a time interval, somewhat of the order of that of the exposure of the aerocamera, it might be that some one of these separate exposures would coincide, as exactly as human means could determine, with that of the aerocamera. However, assume that this chronological coincidence did not occur. For all practical purposes it is safe to assume that a mean determined by the two bracketing series of exposures, or observations, on the part of the auxiliary and qualifying element, will govern or give data allowing me to compute the position of the aerocamera.

Therefore, it is not necessary that the conditions of simultaneity prevail in order to put my idea into practice, nor is this patent application to be considered as limited to those conditions.

Further, the case of photographing the horizon, either a natural one or an artificial one, was chosen as being the simplest means of putting into practice the conception of related observations, at least one of which serves as the leading or main or purposed observation, that is: a station in the direct line between the desire for a preconceived product and the consummation of that desire; and another at least partially as the auxiliary or qualifying or modifying observation.

For example: It is possible to arrange an auxiliary qualifying element operating in known spatial and chronological relation with the aerocamera of this nature, namely, an optical field that is a focal plane produced by an element so compounded of optical elements of refraction and reflection that terrain images taken at divergent angles, laterally or longitudinally, or both, may be brought into such relation that as the aeroplane travels, they "march" with each other, and thereby afford a direct comparison of their individually apparent motions. Specifically, assume that a small angle field taken somewhat toward the rear of an aeroplane, and another field taken somewhat toward the nose of the aeroplane, are brought into lateral, but not necessarily longitudinal coincidence—that is, side by side. Now, if these two images march with the same speed, that line on the ground glass or optical plane (focal plane) upon which their motion is guided, is obviously parallel to that of the mean plane of the terrain. The same arrangement could be applied to small angle views to right and left, as well as to views fore and aft.

Again; the auxiliary observing and recording instrument could be simpler—a camera operating in known chronological and spatial relations with the aerocamera, but whose focal plane makes a finite angle greater than zero with that of the aerocamera, but not so great but that the field of view coincides in large measure with that of the aerocamera. This provides two photographs taken at an angle with each other, a certain part of each of which photographs embraces mutually covered terrain. Obviously, on the assumption that the focal plane of the aerocamera was parallel with the main plain of the terrain, the record of the auxiliary apparatus would display horizontal perspective, and vice versa. Also, if neither were parallel with the mean plane of the terrain, the difference in the quantity and nature of the functions determining perspective in each would permit computation, however laborious and detailed it might be, of the amount and direction of perspective in each.

Moreover, as the figures on Sheet 3 of the drawings prove, the idea is not and never has been thought to have been limited to purely terrestrial observation as a means of qualifying the main record. The sun, the position of which is known at any time, may be one of the necessary number of points required in the determination of position.

Auxiliary observations and recordations of gyroscopic and gyrostatic apparatus are fairly embraced in the basic idea of this application.

It is most emphatically stated that photo observation of a natural, or of an artificial horizon was chosen for the exemplification of the auxiliary and qualifying observing and recording instrument because of its simplicity, and that the term artificial horizon as used in this application covers a line of any sort formed by natural objects whose locations are known, or by targets set at known locations or by objects, the location of which may be found at convenience as well as the artificial horizon as commonly understood in nautical terminology.

Use can be made of all of these by either a direct animate observer or by a series (presumably photographic) of static observations so taken as to form substantially a continuous observation. Therefore these devices are either observational or recordational and may be either automatic or nonautomatic.

Any variations either in mechanism or method which obviously come under the basic idea of qualifying observations and recordations, which are substantially simultaneous with the operation of the main camera or optical instrument, or which chronologically enclose, so to speak, the duration of the main observation in a time interval of an order comparable to that of the duration of the main observation are comprehended by my invention.

I claim:—

1. The combination intended for mounting in fixed relation on an unstable support and in an elevated position comprising a camera, another laterally directed camera adapted to comprehend the horizon in its field of view, the focal plane of said cameras having a known relation to each other, and means for simultaneously operating said cameras whereby to provide data for comparison of their pictures and permit computation of the spatial position of said first mentioned camera with reference to the horizon plane.

2. Apparatus adapted for mounting on an aircraft, comprising the combination of a camera for taking a terrain photograph on a film, another camera provided with an objective adapted to project on a film the images of lateral tell-tale objects apart and remote from said aircraft and which objects subtend an angle at said objective of substantially ninety degrees, the planes of said pairs of film when in proper position for exposure having a known relation to each other and means for simultaneously operating said cameras whereby the position of said tell-tale objects on said second film constitutes data permitting a mathematical determination of both the tip and tilt of said aircraft and hence elements of perspective in the terrain photograph because of inclination of the apparatus at the moment of exposure.

3. The combination for use on an unstable support, of a camera and an optical instrument, said camera and instrument constantly having a known angular relation to each other, said camera and instrument being adapted to contain a sensitized element and a recording element, respectively, said camera and instrument each including an objective, said objectives adapted to project light received thereby from right angularly related directions to said elements respectively and means for simultaneously controlling the exposure of said elements to light whereby to obtain results which upon comparison permit determination of inclined positions of said support at the time of exposure.

4. Apparatus purposed to be carried by an unstable support, comprising the combination of an optical apparatus adapted to contain image recording elements and a pair of objectives adapted to receive light rays along substantially right angularly related axes of two distinct fields of view and means for controlling the admission of light through said objectives and for substituting image recording elements to successive light exposure whereby the change in position of features of images in consequence of movement on the part of said support about different axes may be observed.

5. In apparatus intended to be carried by an aircraft for recording deviations of the latter from a level position, an optical instrument adapted to contain an image recording part the plane of which has a known angular relation to an assumed plane, said instrument having a laterally directed field of view and adapted to project an horizon image upon said part, which image will shift according to the changing spatial positions of said aircraft.

6. In apparatus intended to be carried by an aircraft, a camera adapted to contain a sensitized element having a known angular relation to an assumed plane, said camera including an objective adapted to admit to said element light rays received along a lateral field of view whereby to record a momentary collective relation of certain features of the image obtained to the border of said element and thereby furnish data permitting determination of the coincident spatial position of said aircraft.

7. Apparatus of the character described to be supported in an elevated position on an unstable mounting comprising a camera adapted to contain a sensitized element, said camera having a lateral horizontal axis encompassing object field when the mounting is level including an objective adapted to project a composite land and sky image upon said element, means for controlling the admission of light to said element, whereby to enable deducing from the variation in the relative sizes of the land portion of the image and of the sky portion of the image at certain moments any deviation from horizontal on the part of the axis of the field of view of said instrument at the moment of any particular exposure.

8. The combination to be carried in an elevated position on a moving support of a camera with a downward field of view for exposing a photographically sensitized area, to the terrain, a second camera coordinated in action with the first camera and having a lateral field of view for exposing a different sensitized area at substantially the same time to sky silhouetted objects and means for operating said cameras approximately in unison.

9. The combination for mounting upon a support subject to tilting movements about different axes, of a pair of cameras each adapted to contain a sensitized element, means for simultaneously exposing said elements to bundles of light rays enclosing angularly related axes respectively of distinct fields of view respectively, the planes of said elements having a known relation to each other, whereby the inclination of one of said elements at the moment of exposure may be determined according to the location of a particular feature comprised by the image photographed on the other element and with reference to the bordering edge of the latter.

10. In apparatus to be mounted upon an aircraft, an areo-camera, mechanism for successively feeding sensitized elements into position for exposure within said camera, means for successively exposing said elements, another camera, mechanism for successively feeding other sensitized elements into a known position with reference to the focal plane positions to be assumed by the first series of elements for exposure within said second camera and means for successively exposing said last mentioned elements, and an actuating device for operating both of said feeding and both of said exposing means in timed relation.

11. In apparatus to be mounted upon an aeroplane, a camera provided with a downwardly directed lens, mechanism for successively feeding sensitized elements behind said lens, a shutter for said lens, means for operating the latter, another camera provided with an objective adapted to collect lateral light rays, mechanism for successively feeding other sensitized elements into position to receive images from said objective, another shutter for said objective, means for operating said last mentioned shutter, a motor, and a connection between said motor and both shutter operating means whereby they may be simultaneously operated.

12. The combination for use upon a traveling support of two cameras each adapted to contain a sensitized element, the planes of said elements having a known relation to each other, and objectives for said cameras having fields of view with angularly related axes, said objectives adapted to project images lacking common features upon said elements respectively and each of said objectives comprehending and focusing upon its element an image of an object separate from said support or any part carried thereby and means controlled by the movement of the support for simultaneously operating said cameras whereby the angular disposition of an image on one element may permit of determination of the spatial position of the other element at the moment of simultaneous exposure.

13. Apparatus to be mounted on a vehicle comprising a pair of cameras sighted in directions to avoid overlap in their fields of view and adapted to contain sensitized elements the planes of which when in position for exposure having a known angular relation to each other and mechanism for operating said cameras in unison.

14. The combination of an aerocamera comprehending the terrain in its field of view and adapted to contain a sensitized element, an optical instrument provided with an objective of arcuate shape comprehending the horizon, said instrument including a recording element, said objective including a conical surface and adapted to project an arcuate image of the horizon on said recording element and means for simultaneously controlling the performances of said camera and instrument.

15. The combination of an optical instrument adapted to contain a recording element, said instrument including also an objective provided with a refracting element and a reflecting element, said reflecting element being located between said refracting and recording elements, a second optical instrument including an objective and a recording element, said objectives having the axes of their fields of view angularly related and mechanism for operating one of said instruments and for automatically operating the other instrument in timed relation whereby the disposition of an image on one element affords data for the determination of the spatial position of the other element at the moment of its exposure.

16. Photographic apparatus intended to be mounted on a carrier subject to uncertain movements, said apparatus adapted to comprehend in its field of view fixed natural objects of known location and comprising objectives, one of which includes both a refracting and a reflecting element, said apparatus adapted to contain sensitized areas of known relative spatial positions, said objectives adapted to project images projected along angularly related axes one upon each of said areas, mechanisms for controlling the exposure of said areas to light adapted to pass through said objectives and means for actuating both mechanisms in timed relation whereby the disposition of an image on one area affords data for the determination of the spatial position of the other area at the moment of its exposure.

17. The combination intended for mounting upon a support momentarily subject to uncertain movements, comprising a camera adapted to contain sensitized elements and an optical instrument adapted to contain recording elements, means for periodically bringing one sensitized element and one recording element into their functionating positions, means for periodically controlling the passage of light along angularly related axes of light projection to said elements at substantially the same time, the planes of said elements when in position to receive registrations having a known relation to each other whereby the inclinations of said elements when receiving registrations may be determined according to the relative shifts of the images recorded by said instrument.

18. The combination intended for unstable mounting comprising a camera, another camera, both of said cameras being adapted to contain a sensitized element, said elements being substantially parallel, one of said cameras being provided with an objective including a refracting and a reflecting surface so as to project a photographic image along an angularly related field of view axis, whereby features of said reflected image shift in their relation to the limits of said sensitized element according to the movements of said cameras and means for simultaneously operating said cameras.

19. Apparatus of the character described adapted for unstable mounting in an elevated position comprising the combination of a main camera for taking a desired terrain photograph, a second camera having a sensitized element and an objective including elements so disposed as to produce a tell-tale horizon image on said sensitized element of which the dividing line between land and sky shifts according to the tilt of the mounting at the moment of exposure and means for simultaneously operating said cameras whereby the position of the horizon line on the tell-tale image constitutes data in aid of the calculation of the spatial position of said mounting at the moment of exposure.

20. Apparatus adapted for mounting on an unstable carrier comprising a camera and means for operating it, said camera adapted to contain a sensitized element occupying a predetermined plane with reference to said carrier and an objective adapted to project upon said element an image of a datum line of which points removed from said carrier are the determinants, whereby the angular position of said element at the time of its exposure may be learned according to the photographed angular relation of the photograph of said line with reference to a photographed edge of said element.

21. Apparatus adapted for mounting on an unsteady member, of a camera carried thereby in position with a known relation to the axes of said member and adapted to contain a sensitized element, a shutter, means for operating the latter and an objective so directed as to produce a cartographic image on the sensitized element of said second camera whereby the image produced of a selectable line between feature points of said cartographic image becomes displaced according to the movement of said member and whereby said line may be photographed in any momentarily recorded position to furnish data for the determination of the spatial position of the unsteady member at the moment of exposure.

22. The combination with a carrier subject to uncertain movements, of a camera adapted to contain a sensitized element and a lens, of another camera fixed relative to the first and having an objective including refracting and reflecting elements and a sensitized element, the focal planes of said sensitized elements having a known relation to each other, said objective being disposed to have a lateral field of view and to produce a cartographic image, a single line determining set of points of which become displaced according to the movements of said carrier and means for simultaneously operating said cameras.

23. The combination intended to be carried in fixed relation upon a movable support comprising a camera adapted to take a picture of a desired object, together with photographic apparatus for taking a telltale picture of an object independent of the movements of said support though shiftable in its relation to the field of view of said apparatus according to leaning spatial positions of said support, the focal planes of said camera and apparatus having a known relation to each other and mechanism for operating both camera and apparatus in unison whereby the recorded image of said apparatus furnishes reliable data for the determination of the particular position of said support with reference to a datum plane at the moment of exposure.

24. The combination intended to be carried by an aircraft comprising an aerocamera for taking a series of pictures of differing parts of the terrain, another camera with a focal plane in known relation to the focal plane of the first mentioned camera for taking a series of smaller tell-tale pictures of an object independent of the movements of said aircraft though the images of which shift in position with relation to the bounds of the surfaces on which they are recorded according to constantly changing spatial positions of said aircraft angularly with reference to a datum plane, and mechanism for periodically operating both cameras substantially in unison whereby the recorded image of said apparatus furnishes reliable data for the determination of the unlevel position of said aircraft at the moment of exposure.

25. Apparatus of the character described to be supported and maintained in predetermined relation upon an aircraft comprising the combination of a main camera including a lens and a shutter, means for operating said shutter, an optical instrument including a recording element, an objective and means for controlling the admission of light through the latter, said pair of means being operatively connected whereby projections by said instrument of images upon said recording element may be obtained simultaneously with a photograph by said camera, said instrument comprehending the horizon in its field of view and adapted to project a composite land and sky image upon said recording element, whereby to enable deducing from the variation in the relative sizes of the land portion of the image the deviation from a level position on the part of said aircraft.

26. Apparatus of the character described intended to be mounted upon an aircraft comprising the combination of a downwardly directed camera for obtaining a terrain image, mechanism for operating said camera, another camera connected with said mechanism and adapted to be operated in unison with the operation of said first mentioned camera, said cameras being in fixed relation, a sensitized element in each camera, said elements being positioned in known spatial relation to each other, said second camera being adapted to receive light rays from the horizon so as to project a composite land and sky image upon its sensitized element, whereby to permit observation of the relative sizes of the land and sky portions of the composite image and of the direction thereacross assumed by the horizon line, thereby making known sufficient mathematical data to enable calculation of the relation, of the focal plane of the downwardly directed camera with reference to a horizontal plane, which existed at the moment said cameras were operated.

27. In apparatus of the character described intended to be mounted on a movable carrier, the combination of optical apparatus having its axis extending toward the terrain, said apparatus including a recording element, means for controlling recordation upon said element, another optical apparatus having the axis of its field of view extending in a direction toward the horizon, said last mentioned apparatus including a recording element, means for controlling recordation thereupon, a motor, and connections between said motor and both of said means whereby the latter are operated in timed relation.

28. Apparatus of the character described comprising the combination adapted for use in an elevated position of a main camera, means for operating it, an optical instrument adapted to be operated by said means and adapted to contain a recording area, an objective operatively associated with said instrument and having a lateral field of view so as to be adapted to project a land and sky image upon said area, whereby to enable deducing from the variation in the relative sizes of the land portion of the image and of the sky portion of the image the deviation from horizontal of the axis of the field of view of said instrument at the moment of operation.

29. The hereindescribed method for determining the spatial position of the focal plane of an elevated camera at the moment of obtaining a photograph therewith, which involves the step of additionally projecting a distinct panoramic image by refracting and reflecting light rays from a panoramic object and preserving an image of the latter on a single sensitized element while both said element and the objective are relatively fixed and while the position of the sensitized element for the panoramic image has a known relation to the focal plane on which the terrain is photographed.

30. In photographic apparatus for air craft, film guiding means, means for intermittently moving the film, two objectives for intercepting light rays received along distinct fields of view and directing them to said film mechanism arranged to control the admission of light rays to said film between the intervals of movement of the same for throwing a photographic image of the terrain on the film and simultaneously making a photographic image on the film of qualifying data comprehended by a field of view of objects on a distinct portion of the earth, said successively obtained qualifying images furnishing intelligence for the determination of the spatial positions of said apparatus whenever operated, according to the shift in their group position on the film.

31. The step in the hereindescribed method of obtaining data permitting determination of the horizontal perspective in an aerophotograph taken from an aircraft, which consists in photographing from said aircraft a terrain image and simultaneously obtaining a distinct photograph of an horizon image while the planes of the sensitized surfaces on which said photographs are obtained have a known relation to each other.

32. The step in the method of determining the angular direction at which an aerophotograph of the terrain was taken which consists in making at about the same time a pair of photographs one of a part of the horizon and one of the desired terrain on a pair of distinct sensitized areas respectively while knowing the spatial relation of the planes in which said areas lie at the moment of exposure.

33. The method of optically recording and preserving data for the determination of the spatial positions of a moving picture camera while mounted and operated on an elevated observing station subject to uncertain movements about angularly related horizontal axes, which consists in operating said camera and obtaining at substantially the same time distinct tell-tale photographs of horizon images at corresponding time intervals preparatory to observation and methematical angular calculation according to the changing positions of the horizon line images with reference both to mean proximity to and angular relation to corresponding edges of the tell-tale photographs.

34. The steps in the method of obtaining data for determining the angle to the horizontal at which an aerophotograph was taken, which consists in successively feeding pairs of photographically sensitized areas into position for exposure, and exposing at substantially the same time pairs of said areas to images the light from which is received in right-angularly related directions.

35. The method of recording data sufficient for the determination of the elements of perspective in an aerophotograph of the terrain, which consists in mounting and holding a pair of sensitized elements in known relation to each other and making at substantially the same time a pair of distinct photographs of a part of the horizon and of the desired terrain along converging optical axes respectively.

36. The method of obtaining a record to be used in determining the inclination at which a series of areophotographs were taken, which consists in successively bringing a plurality of sensitized elements into substantially parallel planes, simultaneously photographing the terrain and the horizon on said elements respectively, and then determining the direction and amount of displacement of the horizon images for use in comparison of the simultaneously obtained pictures.

37. The method of graphically recording magnitudes of cartographic angles by obtaining optical projections of their determinants which consists in photographing the terrain and simultaneously employing optical apparatus to observe for measurement a plurality of known points and then calculating a plurality of angles each determined by one of said points, a point in an optical axis and the point of intersection of two lines passing through the particular object point and the point in the optical axis of the field of view in which such particular object lies.

38. The method of obtaining adequate mathematical data for determination of the unlevel positions of a camera carried by an aircraft at the moment of taking pictures therewith which consists in intermittently feeding sensitized surfaces behind the lens of the camera, successively photographing terrain pictures and simultaneously photographing in correspondingly timed relations cartographic objects as they assume altered relative positions with respect to the changing position of the aircraft said objects being chosen so distant as to be constantly to view for repeated photographing.

39. The method of obtaining adequate mathematical data for determination of the unlevel positions of a camera carried by an aircraft at the moments of taking pictures therewith which consists in intermittently feeding sensitized surfaces behind the lens of the camera, successively photographing pictures on said surfaces, intermittently feeding other sensitized surfaces behind the lens of a second camera fixed in position with respect to the position of the first mentioned camera and repeatedly photographing the same distant cartographic objects in corresponding timed relation to record any change in their position with reference to the center of the sensitized surfaces on which they appear.

40. The method of obtaining adequate mathematical data for graphically recording magnitudes of cartographic angles by obtaining optical projections of their determinants which consists in simultaneously exposing a pair of cameras while held in known relation, one of said cameras having a single field of view and the other having a plurality of subsidiary fields of view, and then determining the angle made by the axis of said single field of view with a certain plane according to the recordation obtained by said plurality of fields of view in said second camera.

41. Photographic apparatus intended to be operated in an elevated position on an aircraft including a camera adapted to contain sensitized areas and provided with an objective having a laterally directed field of view, the latter including a refracting and a reflecting surface, means for successively bringing said areas into functionating position, said objective being adapted to project sections of a panoramic line image in various locations upon said areas according to the tilting shifts in position of said aircraft, and means for controlling the admission to said areas successively of light rays projected from said objective while said areas and objective are held relatively fixed.

42. The method contributory to determination of the elements of perspective in an aerophotograph, which consists in establishing a known relation between a sensitized surface upon which the aerophotograph is to appear and another sensitized surface, and simultaneously exposing said surfaces to the terrain object desired and to lateral targets which are fixed and of known location respectively whereby the intelligence furnished of the photographed disposition of said targets constitutes the requisite mathematical factor qualifying an interpretation of the terrain photograph.

43. The method contributing to determination of the angular tilt of a photographically sensitized surface at the moment of its exposure to a selected object which consists in photographing said object and simultaneously photographing a portion of the horizon upon a sensitized area the plane of which has a known relation to the plane of said surface and then measuring the angle which the axis of the horizon field of view makes with a line from the photographing point to the horizon by mathematical calculation of the position of the horizon picture with relation to the borders of said area.

44. The hereindescribed method for obtaining data sufficient for calculating the obliquity of a focal plane with respect to the terrain by effecting optical projections from an elevated aircraft which consists in photographically recording an image received through a field of view, including a vertical line, upon a sensitized surface by refraction and simultaneously recording by reflection combined with refraction, upon another sensitized surface, the plane of which is constantly held in known relation to the plane of said first mentioned surface, an image including a dividing line between horizon silhouetted objects and received through a field of view embracing an horizontal line while allowing a recorded shift of said line, which is refracted and reflected, both turnably and as an entirety in a direction across its recorded plane in response to tilts of said aircraft about angularly related horizon axes respectively.

45. The hereindescribed method of obtaining data from an aircraft for the determination of the perspective in an aerophotograph due to a non-vertical optical axis along which said photograph was obtained, which consists in simultaneously recording upon one of a pair of surfaces having a known relation to each other a principal image and upon the other surface a pair of bordering images of which a common bordering line shifts in position upon said last mentioned surface according to the deviation of the aircraft from a level position, the recorded disposition of said line serving as a function of the spatial position of the aircraft from which said aerophotograph was taken.

46. The hereindescribed method of recording data for determination of the shift in spatial position of a moving support which consists in photographing an image upon a sensitized surface carried by said support and simultaneously recording upon another sensitized surface carried by said support in known relation to said first mentioned surface an image of fixed and spaced objects while allowing the recordation of a shift in any direction of a line determined by the images of said objects and within the limits determined by that edge of said last mentioned surface toward which said line shifts, and according to the shifts of said support so as to constitute a determining factor for learning a momentary spatial position of said support.

47. The hereindescribed method for use in eliminating perspective in aerophotographs which consists in successively recording from an aircraft images upon sensitized surfaces and recording in contemporaneous succession upon other sensitized surfaces wholly distinct images all of which latter include a dividing line determined by objects of ascertainable relative position while allowing the recordation of shifts in both position and direction of said line within the limits determined by that edge of said last mentioned surfaces toward which said line shifts.

48. In apparatus of the character described intended to be mounted on an aircraft, the combination of a main camera having the axis of its field of view extending toward the terrain, said camera adapted to contain a sensitized element, means for controlling exposure thereof and means for intermittently moving said element, another camera having the axis of its field of view extending in a direction toward the horizon, said last mentioned camera including a sensitized element, means for controlling exposure thereof and means for intermittently moving said element, a motor, and connections with said motor enabling all of said means to be intermittently operated in timed relation.

49. Optical apparatus adapted for use on an elevated support subject to uncertain movements comprising the combination of a pair of cameras mounted in predetermined fixed relation to each other and provided with objectives having right angularly related fields of view and parallel optical axes, one of said objectives including a reflecting element and means for operating said cameras at substantially coincident time intervals whereby the photographs of one camera afford data for the termination of elements of perspective in the photographs of the other camera.

50. Optical apparatus comprising the combination of a pair of optical instruments provided with objectives having angularly related fields of view and parallel optical axes respectively, one of said objectives including a reflecting element, means for containing parallel recording elements at the focal planes of said objectives, and means for simultaneously controlling the transmission of light through both objectives to said elements.

51. The combination intended to be mounted on an aircraft comprising a pair of cameras each adapted to contain a sensitized element at the focal plane thereof, a lens in one camera with a downward field of view to comprehend the terrain, an objective in the other camera with a lateral field of view to comprehend fixed and distant objects, the planes of said sensitized elements having a known relation to each other when in position for exposure, and means for simultaneously controlling the admission of light through said lens and objective to said sensitized elements, whereby the image obtained from the lateral field of view on one sensitized element will supply data sufficient to enable calculation of the angle with a horizontal plane of the focal plane in which the image from the downward field of view was registered at the moment light was admitted.

52. The method of recording data permitting determination of the inclination at which an aerophotograph was taken, which consists in mounting distinct sensitized elements in known relation to each other on an aircraft, simultaneously photographing the terrain and the horizon on said elements respectively so that the image of said horizon includes sky and either land or water in proportion to the deviation from horizontal on the part of said aircraft and then determining the relation of the sensitized element on which a terrain image is preserved to an horizon plane by use as a factor of the angular relation of the simultaneously obtained horizon line image with respect to an edge of the photograph of which it is a part.

53. The method of obtaining data sufficient to enable determination of the inclination at which a terrain photograph was taken, which consists in photographing the desired terrain on one sensitized area, simultaneously photographing an horizon line image on another sensitized area having a fixed and known relation to the first mentioned area and determining the angular relation of said horizon line photograph with respect to an edge of the photograph of which it is a part.

54. The method of obtaining sufficient mathematical data for the determination of the tilt of a sensitized area when exposed while mounted on a carrier subject to uncertain movements, which consists in ascertaining an established relation of the plane of said area to the plane of a distinct sensitized area and then simultaneously procuring on one of said areas a photograph of a desired scene and on the other area a photograph of a plurality of known reference points, the recorded images of which are determinants of an angle corresponding to the tilt at the moment of exposure.

55. The contributory method of determining any tilt of a photograph at the moment it was taken from a support subject to uncertain movements, which consists in holding two photographically sensitized areas in planes having a known relation to each other, simultaneously exposing said areas to portions of the terrain and of the horizon respectively and then utilizing the relation of an horizon line with respect to the complete image of which it is a part as the determining factor.

56. The step in the method of learning the inclination of apparatus by which an image was recorded upon a recording surface the plane of which is subject to uncertain movements, which consists in simultaneously recording on another recording surface while held in known relation to the first mentioned surface an image received at an angle with respect to the line along which the first image was sighted.

57. The method of obtaining adequate mathematical data for determining the tilt of a photographically sensitized element at the moment of its exposure which consists in holding two photographically sensitized elements in planes having a known relation to each other, and both at an elevation above the earth's surface, exposing one element to a terrain image and simultaneously exposing the other element to a part of the horizon so that the photographic field encompassed by said last mentioned element includes sky and either land or water, whereby the position of the horizon line with respect to the complete image of which it is a part may serve as the determining factor.

58. The steps in the method of determining the tilt at which a photographic map was taken which consists in holding two photographically sensitized elements in substantially parallel planes both at an elevation above the earth's surface, exposing one element in a downward direction and simultaneously exposing the other element laterally by refraction and reflection so that the field of view of said last mentioned element includes a part of the horizon whereby the position of the horizon line with respect to the complete image of which it is a part may serve as the determining factor.

59. The steps in the method of determining the angles from the horizontal of an aircraft at the moments of photographing successive terrain images from it, which consists in making a number of exposures of one sensitized area in a downward direction to comprehend the terrain, and making an equal number of exposures of another sensitized area in a lateral direction to comprehend objects with respect to which said aircraft moves, said exposures being simultaneously made in pairs in the two directions respectively while the said areas lie in planes having a known relation to each other, and then using the position of a line between the photographed objects as the determining factor for qualifying the terrain photographs.

60. The combination intended to be carried in an elevated position by an aircraft subject to uncertain movements, comprising duplex photographic apparatus including one objective adapted to take a picture of the terrain on a sensitized element disposed in one focal plane and including another objective adapted to take a picture of a tell-tale object on a sensitized element disposed in a parallel focal plane and which tell-tale object is shiftable in its relation to the field of view of said apparatus according to changing positions of a focal plane of said apparatus relative to a horizontal plane and means for operating said apparatus to obtain the pictures at substantially the same time whereby one picture may upon comparison serve as data qualifying the other picture.

61. The step in the method of obtaining data for ascertaining inclination of a recording surface, carried upon a support subject to uncertain movement, at the moment an image appears on said surface, which consists in recording said image on said surface along one optical field of view axis and simultaneously recording on a different recording surface another image formed by a bundle of light rays the axis of which, is a line making a right angle with the axis of the bundle of light rays responsible for the image received on said first mentioned surface while knowing the relation of the planes of said surfaces at the moment of exposure.

62. The method of obtaining data for the determination of the elements of perspective in an aerophotograph of the terrain because of an inclined position of the axis of the field of view of an aerocamera with which said photograph was obtained while carried by an aircraft, which includes the step of taking at substantially the same time on one sensitized area the terrain photograph and on another sensitized area a picture of a tell-tale object the image of which is shiftable in its relation to the bounds of the particular area on which it is to be recorded according to the momentary position of said aircraft angularly with reference to a particular datum plane.

63. The combination, intended for mounting in predetermined relation on an aircraft of a moving picture camera adapted to record a series of desired terrain images, another moving picture camera adapted to record images of an everpresent constantly stationary tell-tale horizon-line determining objects, said tell-tale images shifting according to the coincident positions of said aircraft, mechanism for periodically operating one of said cameras and for periodically operating the other camera at substantially the same time whereby any shifts in position of the successive images of the tell-tale objects in consequence of tipping movements of said aircraft may be referred to for comparison each with its simultaneously obtained companion image.

64. The method of obtaining data for qualifying the disclosure of an aero-photograph of the terrain, obtained along one optical axis from an aircraft, which consists in determining the inclination of the optical axis of the photographic apparatus at the moment said aero-photograph was obtained thereby; by concurrently obtaining with said apparatus another aero-photograph obtained by projection along an optical axis forming an angle with the first mentioned optical axis and then determining the relation of the sensitized element on which a terrain image is preserved to a horizon plane by use as a factor of the angular relation of the simultaneously obtained geographical image with respect to an edge of the photograph of which it is a part.

65. The method of obtaining and applying data for the elimination of elements of perspective which may exist in aerophotographs of a terrain obtained from an aircraft, by reason of a non-vertical optical axis of the photographic apparatus used, which consists in determining variable inclinations of the optical axis of the photographic apparatus, at the moments successive photographs were obtained thereby, by concurrently effecting, recording and preserving by use of said apparatus, optical images of the momentary aspects of a natural geographical object remote enough to be constantly in a field of view of said apparatus, and comparing each pair of synchronously obtained pictures preparatory to finally correcting the terrain photographs by elimination of elements of perspective therein during projection and rephotography thereof and while mounted so as to have an angular relation to the focal plane of the reproducing camera which is determined by the disclosures of the companion tell-tale auxiliary images respectively.

66. The method of obtaining sufficient data mathematically to qualify the disclosure of an aerophotograph having elements of perspective due to its obtainment along an oblique optical axis which consists in concurrently obtaining on distinct sensitized areas, having a known angular relation with respect to each other, optical recordations of the image of the terrain desired and of the image of a completely different object field respectively, the objects of said last mentioned field being viewed through a laterally directed optical path.

67. The method of determining the position of a camera at the moment of taking a picture therewith which consists in photographing a desired object and simultaneously photographing an optical image of a plurality of objects which are determinants of a plurality of cartographic angles.

Signed by me, this 9th day of April, 1920.

EDWIN H. CORLETT.